United States Patent Office 3,810,916
Patented May 14, 1974

3,810,916
PROCESS FOR THE MANUFACTURE OF STEROID TROPONES
Georg Anner, Basel, and Peter Wieland, Oberwil, Basel-Land, Switzerland, assignors to Ciba-Geigy Corporation, Ardsley, N.Y.
No Drawing. Filed July 8, 1969, Ser. No. 840,026
Claims priority, application Switzerland, July 19, 1968, 10,816/68
Int. Cl. C07c 171/02; C07d 13/00
U.S. Cl. 260—340.9
12 Claims

ABSTRACT OF THE DISCLOSURE

The invention concerns the new process for the manufacture of known or new steroid tropones by dehydrogenating a 4-oxo-19-nor-A-homo-steroid-1,5(10)-diene with periodic acid or a salt thereof or with a heavy metal acylate and the new compounds of the formula

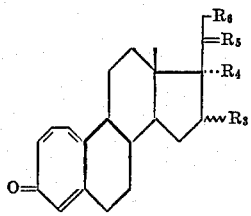

wherein $R_3$ is hydrogen or methyl, $R_4$ stands for hydrogen or a free or esterified hydroxyl group, $R_5$ represents a free or ketalized oxo group and $R_6$ is hydrogen, a free, esterified or etherified hydroxy group having a gestagenic, ovulation inhibiting, antiandrogenic or diuretic effect.

---

The present invention provides a new process for the manufacture of steroid tropones [4-oxo-19-nor-A-homo-steroid-2,4α,10(1)-trienes] by dehydrogenating 3-oxo-19-nor-A-homo-steroid-1,5(10)-dienes.

The manufacture of steroid tropones of the androstane series has been described, for example, by A. J. Birch in J. Chem. Soc. 1963, pp. 3921 et seq. The starting product used is a 3 - methoxy-19-nor-androsta-3,5(10)-diene which is reacted with dibromocarben and silver nitrate, whereby 4 - oxo-19-nor-A-homo-androsta-2,4α,10(1)-trienes and 3-oxo-19-nor-A-homo-androsta, 1,4,5(10)-trienes are obtained.

The present invention is based on the observation that a high yield of a unitary final product is obtained when the readily accessible 4-oxo - 19 - nor-A-homo-steroid-1,5(10)-dienes are dehydrogenated with an oxidant capable of splitting α-glycols.

As oxidants capable of splitting α-glycols there are used periodic acid or its salts, especially with alkali or alkaline earth metals, in the first place lithium periodate, or heavy-metal acylates such as lead tetra-lower alkanoates, preferably lead tetraacetate.

The dehydrogenation is preferably performed at a low temperature, for example at −20° to 50° C., especially at about −5° to 30° C. It is preferably carried out in a solvent, when periodic acid or a periodate is used as dehydrogenating agent advantageously in an aqueous medium, which may be a water-miscible organic solvent, for example an aqueous alcohol such as methanol, tertiary butanol, tetrahydrofuran or dioxan, or when a heavy metal acylate is used advantageously in a hydrocarbon such as benzene, toluene, cyclohexane, glacial acetic acid or especially in pyridine or in a mixture of such solvents.

The starting materials to be used according to this invention are known or may be prepared in known manner, for example by reacting a 3-oxo-steroid-1,4-diene, which contains in position 10 a reactively esterified hydroxy-methyl group, with an alkali metal in an aprotic solvent and in the presence of a polycyclic aromatic hydrocarbon and isolating the resulting 4-oxo-19-nor-A-homo-steroid-1,5(10)-dienes. The starting materials to be used belong to the series of the androstanes, pregnanes, cholestanes or spirostanes. Particularly favorable results are obtained by using compounds of the general formula

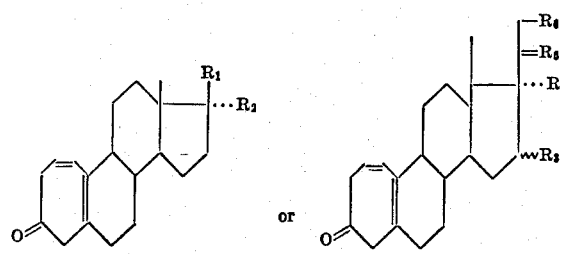

in which $R_1$ represents a free, esterified or etherified hydroxyl group, $R_2$ represents hydrogen or a lower aliphatic hydrocarbon residue or $R_1+R_2$ stand for a free or ketalized oxo group, $R_3$ represents hydrogen or a methyl group preferably in the α-position, $R_4$ represents hydrogen or a hydroxyl group which may be free or esterified with a lower aliphatic carboxylic acid, $R_5$ represents a free or ketalized oxo group and $R_6$ hydrogen or a free, esterified or etherified hydroxyl group, or $R_3+R_4$ stand for an acetonide group and $R_4+R_5$ and $R_5+R_6$ each represent a methylenedioxy group, if desired.

The above-mentioned esterified hydroxyl groups are in the first place derived from organic carboxylic acids of the aliphatic, alicyclic, aromatic or heterocyclic series, especially those containing 1–18 carbon atoms, for example, formic, acetic, propionic, a butyric acid or valeric acid such as n-valeric acid, or trimethylacetic, trifluoroacetic acid, acaproic acid such as β-trimethylpropionic or diethylacetic acid, oenanthic, caprylic, pelargonic, capric acid, and undecylic acid, for example undecylenic acid, lauric, myristic, palmitic or stearic acids, for example oleic acid, cyclopropane-, -butane-, -pentane- or -hexane-carboxylic acid, cyclopropylmethanecarboxylic, cyclobutylmethanecarboxylic, cyclopentylethanecarboxylic, cyclohexylethanecarboxylic acid, the cyclopentyl-, cyclohexyl- or phenyl-acetic or -propionic acids, benzoic acid phenoxyalkane acids such as phenoxyacetic acid, dicarboxylic acids such as succinic, phthalic, quinolic acid, furan-2-carboxylic, 5-tertiary butyl-furan-2-carboxylic, 5-bromo-furan-2-carboxylic acid, nicotinic or isonicotinic acid, or from sulfonic acids such as benzenesulfonic acids or from inorganic acids, for example acids of phosphorus or sulfur.

The ester groups may also be derived from orthocarboxylic acids such as orthoformic, orthoacetic or orthopropionic acid, and these acids, like the above-mentioned dicarboxylic acids, may also furnish 17,21-esters.

Etherified hydroxyl groups are especially those derived from alcohols containing 1–8 carbon atoms, such as lower aliphatic alkanols, ethyl alcohol, methyl alcohol, propyl alcohol, isopropyl alcohol, a butyl or amyl alcohol, from cycloalkanols such as cyclopentanol or from araliphatic alcohols, especially from monocyclic aryl-lower aliphatic alcohols such as benzyl alcohol, or from heterocyclic alcohols such as α-tetrahydropyranol or -furanol.

Lower aliphatic hydrocarbon residues are especially lower alkyl groups, such as methyl or ethyl, lower alkenyl groups such as vinyl, allyl or methallyl, or lower alkinyl groups such as ethinyl or propionyl residues.

If desired, esterified or etherified hydroxyl groups or ketals in products of this invention may be liberated in known manner or free hydroxyl groups esterified, especially with the acids mentioned above, or with their anhydrides or halides, or they may be etherified, especially with the alcohols mentioned above.

Another object of the present invention is the 4-oxo-19-nor-A-homo-steroid-2,4α,10(1)-trienes of the pregnane series accessible by the present process, especially those of the general formula

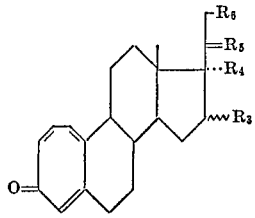

in which $R_3$, $R_4$, $R_5$ and $R_6$ have the above meanings. They are new and possess valuable pharmacological properties. Inter alia, they display a gestagenic ovulation inhibiting, antiandrogenic or diuretic effect.

The present invention is also concerned with the manufacture of pharmaceutical preparations for use in human or veterinary medicine containing the new pharmacologically active compounds of this invention as active ingredients in conjunction or admixture with a pharmaceutical excipient. The excipient used is an organic or inorganic substance suitable for enteral, for example oral, parenteral or local administration. Suitable excipients are substances that do not react with the new compounds, for example water, gelatin, lactose, starches, magnesium stearate, talcum, vegetable oils, benzyl alcohols, gums, polyalkyleneglycols, white petroleum jelly, cholesterol or other known medicinal excipients. The pharmaceutical preparations may be in solid form, for example tablets, dragees or capsules, or in liquid or semiliquid form, being solutions, suspensions, emulsions, ointments or creams. These pharmaceutical preparations may be sterilized and/or contain assistants such as preserving, stabilizing, wetting or emulsifying agents, salts for regulating the osmotic pressure or buffers. They may also contain further therapeutically valuable products. The new compounds may also be used as starting materials in the manufacture of other valuable compounds.

The invention includes also any variant of the process in which an intermediate obtained at any stage of the process is used as starting material and the remaining steps are carried out or a starting material is formed under the reaction conditions or used in the form of a salt or other derivative thereof.

The following examples illustrate the invention.

EXAMPLE 1

While cooling with ice and stirring, a solution of 164 mg. of 4-oxo-17-ethylenedioxy-A-homo-$\Delta^{1,5(10)}$-19-nor-androstadiene and 100 mg. of potassium acetate in 10 ml. of methanol, is mixed with 0.5 ml. of a 1.2 molar solution of periodic acid in water, whereupon a precipitate of potassium periodate forms.

After stirring for 18 hours at room temperature another 100 mg. of potassium acetate and 0.5 ml. of the periodic acid solution are added. 22 hours later, the batch is poured into dilute sodium bicarbonate solution, extracted with methylenechloride, washed with dilute sodium chloride solution, dried and evaporated under vacuum. Crystallization of the residue from methylenechloride+ether furnishes 62 mg. of 4-oxo-17-ethylenedioxy-A-homo-$\Delta^{1(10),2,4\alpha}$-19-nor-androstatriene which is identical with an authentic reference sample.

EXAMPLE 2

While cooling with ice and stirring, a solution of 1.64 g. of 4-oxo-17-ethylenedioxy - A - homo-$\Delta^{1,5(10)}$-19-nor-androstadiene in 100 ml. of methanol is mixed with 10 ml. of a solution of lithium acetate prepared from 700 mg. of lithium carbonate, 10 ml. of water and 1.2 ml. of glacial acetic acid. Then 5 ml. of a 1.2 molar solution of periodic acid in water are added and the batch is stirred for 5 hours at 0° C. and then again mixed with 50 ml. of methanol, 5 ml. of lithium acetate solution and 2.5 ml. of the periodic acid solution. 18 hours later the batch is poured into dilute sodium bicarbonate solution and extracted with methylenechloride and ether. The organic solutions are washed with dilute sodium chloride solution, dried and evaporated under vacuum and the residue is crystallized from methylenechloride+ether to yield 1.282 g. of 4-oxo-17-ethylenedioxy-A-homo-$\Delta^{1(10),2,4\alpha}$-19-nor-androstatriene.

The mother liquor is evaporated and the residue separated on 3 plates of silica gel of 1 meter in the system toluene+acetate (4:1), whereby another 88 mg. of triene are obtained so that the total yield amounts to 1.37 g.

EXAMPLE 3

A mixture of 164 mg. of 4-oxo-17-ethylenedioxy-A-homo-$\Delta^{1,5(10)}$-19-nor-androstadiene, 10 ml. of methanol and 0.5 ml. of 1.2 molar periodic acid in water is stirred overnight at room temperature. The clear brown solution is then poured into dilute sodium bicarbonate solution containing a little sodium thiosulfate and extracted with methylenechloride. The methylenechloride solutions are washed with dilute sodium chloride solution, dried and evaporated under vacuum and the residue is chromatographed on a plate of silica gel of 1 meter in the system toluene+acetone (4:1). Thus, by crystallization from a mixture of methylenechloride+ether 22 mg. of the known 4,17-dioxo - A - homo-$\Delta^{1(10),2,4\alpha}$-19-nor-androstatriene are obtained.

EXAMPLE 4

While cooling with ice and stirring, a solution of 1.8 g. of 4-oxo-17α-methyl-17β-hydroxy - A - homo-$\Delta^{1,5(10)}$-19-nor-androstadiene in 120 ml. of methanol is mixed with 12 ml. of the lithium acetate solution described in Example 2 and 6 ml. of a 1.2 molar solution of periodic acid in water. The mixture is stirred for 18 hours at 0° C., then poured into dilute sodium bicarbonate solution, extracted with methylenechloride, washed with dilute sodium chloride solution, dried and evaporated under vacuum. Chromatography on 90 g. of silica gel and crystallization from methylenechloride+ether furnishes 1.2 g. of 4-oxo-17α-methyl-17β-hydroxy - A - homo-$\Delta^{1(10),2,4\alpha}$-19-nor-androstatriene which melts at 198–203.5° C. after further recrystallization.

EXAMPLE 5

While cooling with ice and stirring, a solution of 150 mg. of 4-oxo-17-ethylenedioxy-A-homo-$\Delta^{1,5(10)}$-19-nor-androstadiene in 5 ml. of pyridine is mixed with 500 mg. of lead tetraacetate containing about 10 to 15% of glacial acetic acid. 1 hour later the mixture is poured into dilute sodium chloride solution, extracted with toluene, washed with dilute sodium chloride solution, dried and evaporated under vacuum. The residue is separated on a plate of silica gel of 1 meter in the system toluene+acetone (4:1). Crystallization from methylenechloride+ether then furnishes 44 mg. of 4-oxo-17-ethylenedioxy-A-homo-$\Delta^{1(10),2,4\alpha}$-19-nor-androstatriene.

EXAMPLE 6

While cooling with ice and stirring, a solution of 1.24 g. of 4-oxo-17α-ethinyl-17β-hydroxy-A-homo$\Delta^{1,5(10)}$-19-nor-androstadiene in 80 ml. of methanol is mixed with 8 ml. of lithium acetate solution (prepared from 560 mg. of lithium carbonate, 8 ml. of water and 0.96 ml. of glacial acetic acid) and then with 4 ml. of a 1.2 molar solution of periodic acid in water. After stirring for 17 hours at 0° C. the batch is poured into dilute sodium bicarbonate solution and extracted with methylenechloride. The organic solutions are washed with dilute sodium chloride solution, dried and evaporated under vacuum. Crystallization from methanol+methylenechloride+ether with the use of 120 mg. of Carboraffin furnishes 1 g. of the known 4-oxo-17α-ethinyl-17β-hydroxy-A-homo-Δ$^{1(10),2,4a}$-19-nor-androstatriene.

EXAMPLE 7

While cooling with ice and stirring, a solution of 370.5 mg. of 4,20-dioxo-17α-acetoxy-A-homo-Δ$^{1,5(10)}$-19-nor-progesterone in 20 ml. of methanol is mixed with 2 ml. of a solution of lithium acetate prepared from 140 mg. of lithium carbonate, 2 ml. of water and 0.24 ml. of glacial acetic acid; then 1 ml. of a 1.2-molar solution of periodic acid in water is added and the whole is stirred for 18 hours at 0° C. and then poured into dilute sodium bicarbonate solution, extracted with methylenechloride and a mixture of methylenechloride+ether, washed with dilute sodium chloride solution, dried and evaporated under vacuum. The residue is chromatographed in the system toluene+acetone (4:1) on two plates of silica gel of 1 meter. The main zone is then scratched out and eluted with a toluene+methanol mixture 4:1. The eluate is washed with water and further extracted with toluene, then dried and evaporated under vacuum, to yield 280 mg. of 4,20-dioxo - 17α - acetoxy-A-homo-Δ$^{1(10),2,4a}$-19-nor-pregnatriene.

We claim:

1. A process for the manufacture of steroid tropones wherein a 4-oxo-19-nor-A-homo-steroid-1,5(10)-diene of the androstane, pregnane, cholestane or spirostane series is dehydrogenated at —20 to +50° C. with an oxidant capable of splitting an α-glycol selected from the group consisting of periodic acid, a salt of periodic acid with an alkali or alkaline earth metal and a lead-tetra-lower alkanoate.

2. A process as claimed in claim 1, wherein an alkali or alkaline earth metal salt of periodic acid is used as oxidant.

3. A process as claimed in claim 2, wherein lithium periodate is used as oxidant.

4. A process as claimed in claim 1, wherein a lead tetra-lower alkanoate is used as oxidant.

5. A process as claimed in claim 4, wherein lead tetraacetate is used as oxidant.

6. A process as claimed in claim 1, wherein the reaction is carried out in an aqueous medium.

7. A process as claimed in claim 1, wherein starting material of the formula

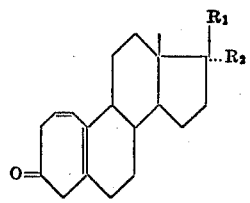

is used, in which $R_1$ represents a free hydroxyl group, a hydroxy group esterified with a hydrocarbon carboxylic acid having 1 to 18 carbon atoms or a hydroxy group etherified with an alkanol having 1 to 8 carbon atoms and $R_2$ stands for hydrogen or a lower aliphatic hydrocarbon radical, or $R_1$ and $R_2$ together represent a free oxo group or an ethylenedioxy group.

8. A process as claimed in claim 7, wherein 4-oxo-17-ethylenedioxy-A-homo-19 - nor-androsta-1,5(10)-diene is used as starting material.

9. A process as claimed in claim 7, wherein 4-oxo-17α-methyl-17β-hydroxy - A-homo-19 - nor-androsta-1, 5(10)-diene is used as starting material.

10. A process as claimed in claim 7, wherein 4-oxo-17α-ethinyl-17β-hydroxy-A-homo-19-nor - androsta - 1,5 (10)-diene is used as starting material.

11. A process as claimed in claim 1, wherein starting material of the formula

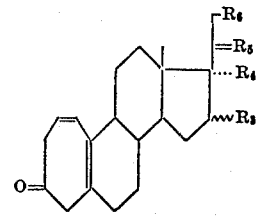

is used, in which $R_3$ represents hydrogen or a methyl group, $R_4$ represents hydrogen or a hydroxy group which is free or esterified with a hydrocarbon carboxylic acid having 1-18 carbon atoms, $R_5$ stands for a free oxo group or an ethylenedioxy group, and $R_6$ for hydrogen, a free hydroxyl group, a hydroxy group esterified with a carboxylic acid having 1 to 18 carbon atoms or a hydroxy group etherified with an alkanol having 1 to 8 carbon atoms, or $R_3$ and $R_4$ together represent an acetonide group, or $R_4+R_5$ and $R_5+R_6$ each represent a methylenedioxy group.

12. A process as claimed in claim 11, wherein 4,20-dioxo-17α - acetoxy - A-homo-19-nor-Δ$^{1,5(10)}$-progesterone is used as starting material.

References Cited
UNITED STATES PATENTS

| | | | |
|---|---|---|---|
| 3,636,055 | 1/1972 | Anner et al. | 260—586 H |
| 3,415,845 | 12/1968 | Knox | 260—586 H |
| 3,410,874 | 11/1968 | Birch | 260—586 H |

OTHER REFERENCES

Chem. Abstracts, 66:18795k.

VIVIAN GARNER, Primary Examiner

U.S. Cl. X.R.

260—295 A, 295.5 P, 340.5, 345.9, 347.5, 347.8, 410, 456 R, 468 R, 473 G, 473 S, 475 N, 476 C, 485 G, 485 L, 488 B, 491, 586 H, 590, 920; 424—266, 283, 285, 308, 311, 312, 313, 331